United States Patent
Dunn

(10) Patent No.: US 10,584,633 B2
(45) Date of Patent: Mar. 10, 2020

(54) SEMI-CLOSED CYCLE TURBINE POWER SYSTEM TO PRODUCE SALEABLE CO$_2$ PRODUCT

(71) Applicant: Paul M. Dunn, W. Kingston, RI (US)

(72) Inventor: Paul M. Dunn, W. Kingston, RI (US)

(73) Assignee: Enhanced Energy Group LLC, West Kingston, RI (US)

(*) Notice: Subject to any disclaimer, the term of this patent is extended or adjusted under 35 U.S.C. 154(b) by 954 days.

(21) Appl. No.: 14/013,255

(22) Filed: Aug. 29, 2013

(65) Prior Publication Data

US 2014/0230401 A1    Aug. 21, 2014

Related U.S. Application Data

(60) Provisional application No. 61/723,130, filed on Nov. 6, 2012, provisional application No. 61/694,858, filed on Aug. 30, 2012.

(51) Int. Cl.
*F02C 3/34* (2006.01)
*F02C 6/18* (2006.01)
(Continued)

(52) U.S. Cl.
CPC .......... *F02C 3/34* (2013.01); *F02C 6/18* (2013.01); *F02C 7/08* (2013.01); *B01D 53/047* (2013.01);
(Continued)

(58) Field of Classification Search
CPC ...... F02C 1/81; F02C 3/34; F02C 6/18; Y02E 20/326; Y02E 20/185
(Continued)

(56) References Cited

U.S. PATENT DOCUMENTS 2,376,003 A * 5/1945 Palmer .............. B65B 7/04
493/93
2,884,912 A    5/1959 Lewis
(Continued)

FOREIGN PATENT DOCUMENTS

EP         0277777 A2 *  8/1988  .............. F01K 3/00
WO      WO-0190548 A1    11/2001
WO    WO-2014036256 A1    3/2014

OTHER PUBLICATIONS

Umair Irfan; Can Carbon Dioxide Replace Steam to Generate Power?; Mar. 3, 2015; E&E News; p. 3 and 4. https://www.scientificamerican.com/article/can-carbon-dioxide-replace-steam-to-generate-power/.*

(Continued)

*Primary Examiner* — Ted Kim
(74) *Attorney, Agent, or Firm* — Locke Lord LLP; Daniel J. Fiorello

(57) ABSTRACT

Disclosed is a semi-closed cycle turbine engine power system, operating with air, enriched air, or oxygen as the oxidizer, is made non-emissive via the semi-closed cycle, in a manner which produces saleable CO$_2$ product at pressure. In an embodiment of the present disclosure, the system includes, among other elements, an oxidizer supply subsystem for producing an oxidizer and a turbine engine. The oxidizer supply subsystem provides at least a portion of the oxidizer produced by the oxidizer supply sub-system to a main compressor stage of the turbine engine. A fuel supply system is also included for providing fuel to turbine engine. Operation of the turbine engine produces power and an exhaust gas. At least a portion of the exhaust gas is recirculated via a recirculation subsystem to the main compressor stage of the turbine engine.

15 Claims, 1 Drawing Sheet

(51) Int. Cl.
*F02C 7/08* (2006.01)
*B01D 53/26* (2006.01)
*B01D 53/047* (2006.01)
*B01D 53/04* (2006.01)

(52) U.S. Cl.
CPC ...... *B01D 53/0462* (2013.01); *B01D 53/0476* (2013.01); *B01D 53/261* (2013.01); *B01D 53/265* (2013.01); *B01D 2256/22* (2013.01); *B01D 2258/01* (2013.01); *F05D 2260/61* (2013.01)

(58) Field of Classification Search
USPC ...................................................... 60/39.52
See application file for complete search history.

(56) References Cited

U.S. PATENT DOCUMENTS

| | | | |
|---|---|---|---|
| 3,134,228 A | 5/1964 | Wolansky et al. | |
| 3,559,402 A | 2/1971 | Stone et al. | |
| 3,736,745 A | 6/1973 | Karig | |
| 3,785,145 A * | 1/1974 | Amann | F02C 9/16 60/39.24 |
| 3,971,211 A * | 7/1976 | Wethe | F01K 7/32 60/39.181 |
| 3,980,064 A | 9/1976 | Ariga et al. | |
| 4,434,613 A | 3/1984 | Stahl | |
| 4,674,463 A | 6/1987 | Duckworth et al. | |
| 4,725,381 A * | 2/1988 | Pinto | B01D 53/047 252/373 |
| 4,733,526 A * | 3/1988 | Garrett | C01B 21/0494 60/783 |
| 4,899,544 A | 2/1990 | Boyd | |
| 5,170,727 A * | 12/1992 | Nielsen | B05B 7/32 110/238 |
| 5,226,931 A * | 7/1993 | Combier | B01D 53/22 95/139 |
| 5,724,805 A * | 3/1998 | Golomb | F01K 23/106 60/39.12 |
| 5,972,077 A * | 10/1999 | Judkins | B01D 53/02 95/136 |
| 6,116,027 A * | 9/2000 | Smith | F02C 6/10 60/648 |
| 6,256,994 B1 | 7/2001 | Dillon, IV | |
| 6,301,927 B1 * | 10/2001 | Reddy | F25J 3/0209 62/619 |
| 6,375,716 B1 * | 4/2002 | Burchell | B01D 53/0431 95/114 |
| 6,622,470 B2 | 9/2003 | Viteri et al. | |
| 6,637,183 B2 | 10/2003 | Viteri et al. | |
| 7,043,920 B2 | 5/2006 | Viteri et al. | |
| 7,472,550 B2 | 1/2009 | Lear, Jr. et al. | |
| 7,827,794 B1 | 11/2010 | Pronske et al. | |
| 7,882,692 B2 | 2/2011 | Pronske et al. | |
| 7,926,275 B1 | 4/2011 | Dunn | |
| 7,926,276 B1 | 4/2011 | Dunn | |
| 7,937,930 B1 | 5/2011 | Dunn | |
| 7,951,339 B1 | 5/2011 | Dunn | |
| 8,012,446 B1 * | 9/2011 | Wright | B01D 53/75 423/437.1 |
| 8,075,645 B2 * | 12/2011 | Jia | B01J 3/008 48/101 |
| 8,156,726 B1 * | 4/2012 | Dunn | F02C 7/10 60/39.5 |
| 8,205,455 B2 | 6/2012 | Popovic | |
| 8,596,075 B2 | 12/2013 | Allam et al. | |
| 8,776,532 B2 | 7/2014 | Allam et al. | |
| 8,852,456 B2 * | 10/2014 | Valentin | B01D 53/047 252/373 |
| 8,869,889 B2 | 10/2014 | Palmer et al. | |
| 9,671,162 B2 * | 6/2017 | Mak | F25J 3/0257 |
| 9,791,210 B2 * | 10/2017 | Higginbotham | F25J 3/029 |
| 2001/0042367 A1 | 11/2001 | Frutschi | F01K 21/042 60/772 |
| 2002/0023423 A1 * | 2/2002 | Viteri | F01K 21/047 60/772 |
| 2002/0134085 A1 * | 9/2002 | Frutschi | F01K 25/103 60/772 |
| 2003/0097843 A1 * | 5/2003 | Sugarmen | C01B 3/34 60/780 |
| 2004/0003592 A1 | 1/2004 | Viteri et al. | |
| 2004/0238654 A1 * | 12/2004 | Hagen | F01K 21/047 237/12.1 |
| 2006/0115691 A1 * | 6/2006 | Hilmen | B01D 53/22 429/411 |
| 2008/0104958 A1 * | 5/2008 | Finkenrath | B01D 53/00 60/605.2 |
| 2009/0013871 A1 * | 1/2009 | Darde | B01D 53/04 95/129 |
| 2009/0107141 A1 * | 4/2009 | Chillar | F02C 1/08 60/605.2 |
| 2009/0223229 A1 * | 9/2009 | Wang | B01D 53/228 60/780 |
| 2010/0101231 A1 * | 4/2010 | Westmeier | F01K 23/10 60/783 |
| 2010/0326084 A1 * | 12/2010 | Anderson | F01K 23/10 60/775 |
| 2011/0042968 A1 * | 2/2011 | Tronstad | F01K 23/10 290/1 R |
| 2011/0088550 A1 * | 4/2011 | Tirio | B01D 53/02 95/96 |
| 2011/0138766 A1 * | 6/2011 | ELKady | F02C 3/30 60/39.24 |
| 2011/0192139 A1 | 8/2011 | Paik | |
| 2011/0302922 A1 * | 12/2011 | Li | F01K 23/101 60/645 |
| 2012/0023956 A1 * | 2/2012 | Popovic | F02C 3/34 60/772 |
| 2012/0096770 A1 * | 4/2012 | Van Den Born | B01D 53/002 48/197 R |
| 2013/0104525 A1 * | 5/2013 | Allam | F25J 3/04018 60/273 |
| 2013/0108531 A1 * | 5/2013 | Mitariten | B01D 53/047 423/219 |
| 2014/0060013 A1 * | 3/2014 | Dunn | F02M 25/07 60/278 |
| 2014/0230401 A1 * | 8/2014 | Dunn | F02C 3/34 60/39.52 |

OTHER PUBLICATIONS

Steven Wright, Operation and Analysis of a Supercritical CO2 Brayton Cycle; Sep. 2010; Sandria Reports.*
International Search Report and Written Opinion dated Dec. 10, 2013 from corresponding PCT Application No. PCT/US2013/057290.
Article 94(3) EPC Communication, of the European Patent Office, dated Apr. 9, 2018, issued in corresponding European Patent Application No. 13832855.4.

* cited by examiner

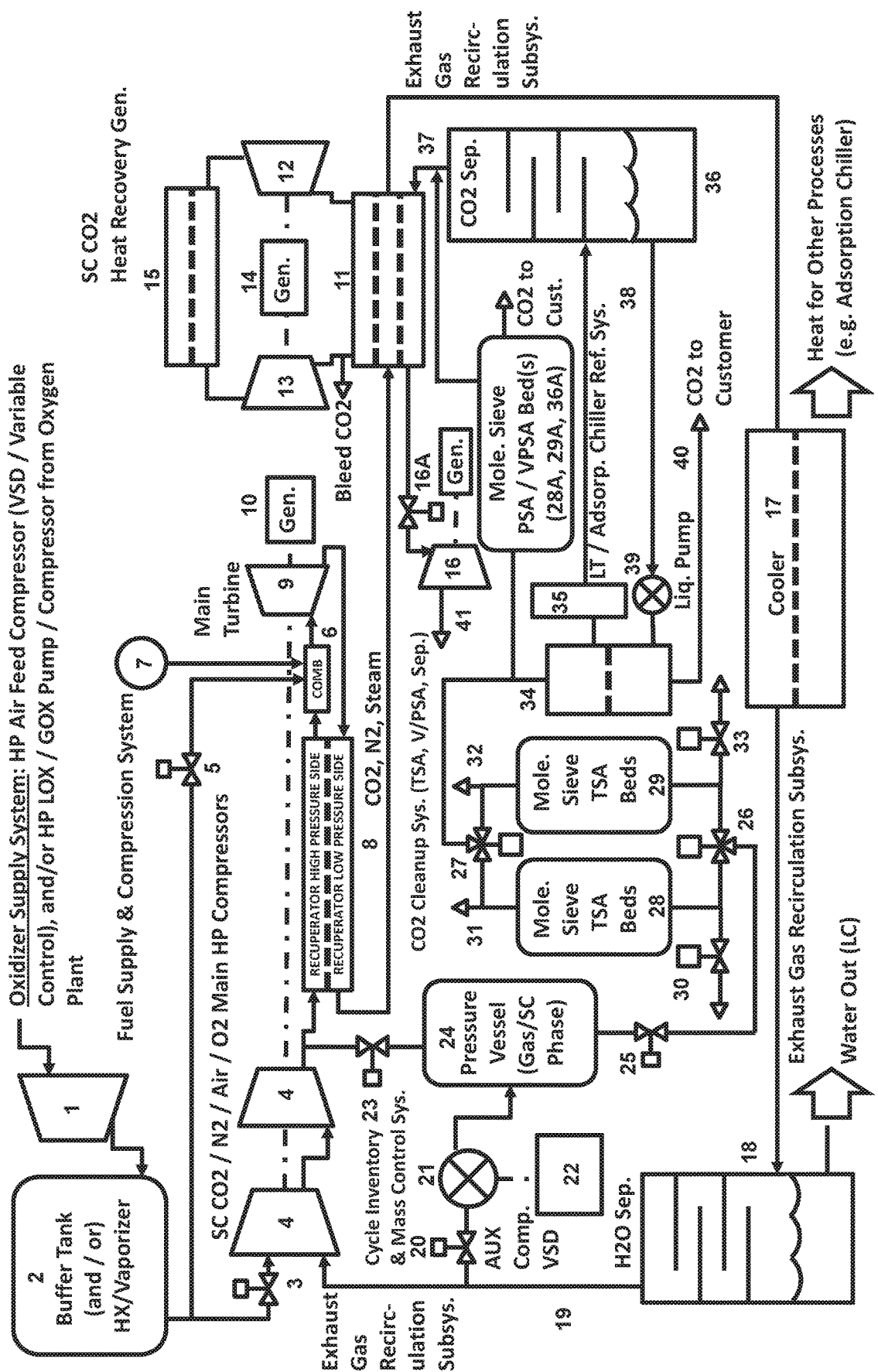

SEMI-CLOSED CYCLE TURBINE POWER SYSTEM TO PRODUCE SALEABLE $CO_2$ PRODUCT

CROSS REFERENCE TO RELATED APPLICATIONS

This application claims priority to U.S. Provisional Patent Application Ser. No. 61/723,130, filed Nov. 6, 2012, entitled Cycle Turbine Engine Power System and U.S. Provisional Patent Application No. Ser. No. 61/694,858, filed Aug. 30, 2012, entitled Cycle Piston Engine Power System, the disclosures of each are herein incorporated by reference in their entirety.

BACKGROUND OF THE INVENTION

1. Field of the Invention

The invention generally relates to a cycle turbine engine power system and more particularly to a semi-closed cycle turbine engine power system operating in a semi-closed Brayton cycle and having an integrated high pressure air/oxygen supply, SC $CO_2$ heat recovery, high pressure carbon dioxide capture and clean-up, and a non-condensable turbo expander for power recovery.

2. Background of the Related Art

Conventional power systems, whether internal or external combustion, burn fuel with air and generally vent the combustion products (exhaust/flue gas) to the air (or via underwater interface to the air). This is true of natural gas, gasoline, and diesel piston engines, and also of gas turbines, jet engines, or even steam boiler based power plants. Emissions of the untreated flue gas to the air, while simple to execute, is not desirable for environmental reasons. Gases such as $SO_2$, NOx, CO, HC (unburned hydro carbon) and more recently $CO_2$ are defined as pollutants and are regulated. In special purpose applications, in particular for undersea applications, the requirement to tie the system exhaust pressure to the ambient pressure (elevated backpressure) can lower engine cycle efficiency significantly. In other special purpose applications, in particular at higher altitudes, the requirement to tie the system pressure to the ambient pressure (reduced inlet pressure) can reduce specific power significantly, and may also impact efficiency.

As a result, there has been a desire to become non-emissive and/or to have less of an adverse impact from the local ambient pressure, and prior work on various closed or semi-closed power systems has occurred. Historically (in the first part of the 1900's) this work was mostly related to the special purpose applications. More recently it is mostly about the ability to provide higher efficiency and/or effectively control emissions or even capture system emissions, in particular $CO_2$.

The strongest early motivation to develop closed and semi-closed power systems has been tied to the production of power undersea. In U.S. Pat. No. 2,884,912, a simple method of operating a piston engine using liquid oxygen, while using the liquid heat of vaporization to condense the products is disclosed. Since this is an undersea application, there is no discussion of product clean up or the production of oxygen. In U.S. Pat. No. 3,134,228 another clearly undersea semi-closed power system is disclosed, using turbines. Again, liquid oxygen (LOX) is carried on board as the oxidizer. Condensed water is pumped and used as the combustion diluent to control temperatures, in the same way water, oxygen, and hydrocarbon are combined in "steamfish" torpedoes, such as the US Mk 16 (introduced late in WWII). In U.S. Pat. No. 3,559,402, liquefaction of the $CO_2$ and storage is disclosed. Again the vaporization of the onboard liquid oxygen is used to provide the refrigeration. Importantly, no effort is made to operate the engine at other than normal atmospheric conditions. In fact, 14 psia is the recirculating pressure for the $CO_2/O_2$ stream.

In U.S. Pat. No. 3,736,745, a "supercritical" closed cycle turbine system is introduced. There are some technical problems with this patent, but it is intended to operate at depth and at high enough backpressure that both the $CO_2$ and water product are condensed together as liquids, without the use of cryogenic oxygen.

In U.S. Pat. No. 3,980,064, Nissan motors provides details on a piston engine or rotary piston engine patent using $H_2O_2$ as the oxidizer. This system includes exhaust recirculation, but the patent is mostly about the injector design and the ability to burn multiple fuels. Injector design for direct use of $H_2O_2$ is critical as decomposition can occur at points in the cycle where it would not be desirable.

In U.S. Pat. No. 4,434,613, the General Electric Company introduces the semi-closed cycle gas turbine (Brayton Cycle) for "chemical" production, including $CO_2$. This patent is clearly not for undersea application, and the integration of the system with a cryogenic air separation unit is included. The system is not operated at high backpressure, and the recirculated exhaust gases ($O_2$, $CO_2$ and others, not mentioned herein). The point of this gas mixture is to mimic the thermodynamic properties of air, so that existing, 14 psia inlet pressure molecular weight 29 (air) gas turbine machinery designs could be used. As is also typical of GE, a Heat Recovery Steam Generator (HRSG) is used, not a recuperator. However, U.S. Pat. No. 3,134,228, does not disclose any details or methodologies associated with product gas clean up. In U.S. Pat. No. 4,674,463, the Cosworth Engine company reintroduces the semi-closed cycle piston engine for undersea applications. The ability to vary the oxygen concentration to values lower than 21% was used to limit oxygen loss in the direct sea water condensation process.

In the Dunn Brayton Patents, U.S. Pat. Nos. 7,926,275, 7,926,276, 7,937,930, 7,951,339, and 8,156,726, the closed (metal fuel) and semi-closed (hydro carbon fuel) Brayton (gas turbine) cycles are introduced. These patents are specifically not at atmospheric pressure, but at high closed cycle pressures (subcritical or supercritical). Inert gas working fluids, mixtures of inert gas working fluids and $CO_2$, and $CO_2$ only are discussed. Two of these patents address a gas clean up methodology, but it is not associated with gas product, but with scrubbing any metal vapor (fuel) out of the gas to avoid plating inside the turbine or recuperator. Oxygen generation is not addressed, since these patents were targeted towards undersea systems with high pressure bottled or liquid oxygen.

In formerly classified Navy work in the 1950's an air breathing semi-closed Brayton cycle was developed which included a closed "high pressure" recuperated turbine, fed by a low pressure turbine—this is essentially the equivalent of "turbo-charging" a gas turbine, and had the benefit of reduction of machinery size and reduction of air/exhaust volume flow rate (this was an alternative to the nuclear propulsion system under development). Later this work was reviewed by Lear and others, and in U.S. Pat. No. 7,472,550 B2, Lear expands on this with the addition of an adsorption chiller. The goal of this effort, in addition to power production and refrigeration, is water production.

Finally, In U.S. Pat. No. 8,205,455, GE provides a complex arrangement of gas turbines, with stoichiometric (air based) combustion and exhaust gas recirculation. In this system, $N_2$ and $CO_2$ are recirculated, and only enough high pressure air is used to support the combustion—the reduction in excess air makes the flue gas easier to clean up for other applications.

SUMMARY OF THE INVENTION

The purpose and advantages of the invention will be set forth in and apparent from the description that follows. Additional advantages of the invention will be realized and attained by the devices, systems and methods particularly pointed out in the written description and claims hereof, as well as from the appended drawings.

The present disclosure is directed to a cycle turbine engine power system that includes, inter alia, an oxidizer supply subsystem, a turbine engine, a fuel supply system and an exhaust gas recirculation system. The oxidizer supply subsystem produces an oxidizer.

The turbine engine includes at least one main compressor stage, a combustor and a main turbine and the oxidizer supply subsystem provides at least a portion of the oxidizer produced to the at least one main compressor stage. The fuel supply system provides fuel to the combustor of the turbine engine and wherein operation of the turbine engine produces power and an exhaust gas. The exhaust gas recirculation subsystem recirculates at least a portion of the exhaust gas created by operation of the turbine engine to the at least one main compressor stage of the turbine engine. Preferably, the exhaust gas recirculation subsystem can include a heat exchanger and a water cooling and separation subsystem.

In certain constructions, the system further includes a heat recovery unit to generate additional power via the super critical Brayton $CO_2$ cycle.

It is envisioned that the system can also include a $CO_2$ capture and cleanup subsystem for producing $CO_2$ at a desired pressure from at least a portion of the exhaust gas.

Still further, embodiments of the present invention are provided with a non-condensable turbo expander for additional waste heat and power recovery.

In embodiments of the present invention, the oxidizer supply subsystem provides air as an oxidizer to the turbine engine. The air can be enriched air have greater than about 21 percent oxygen by volume. In such constructions, the oxidizer supply sub-system can include a compressor and a buffer tank.

Alternatively, the oxidizer supply subsystem can provide high purity oxygen as an oxidizer to the turbine engine. In such constructions, the oxidizer supply sub-system can include a pump and a vaporizer.

It is envisioned that in certain embodiments of the present invention, the system has a recuperator positioned between the at least one main compressor stage and combustor of the turbine engine.

Preferably, a portion of the oxidizer produced by the oxidizer supply subsystem is provided to the combustor of the turbine engine.

It is presently envisioned that the cycle turbine engine power system can include a waste heat recovery system. The waste heat recovery system can include a super/sub-critical $CO_2$ Brayton cycle heat recovery generator. Alternatively, the waste heat recovery system can includes an Organic Rankine Cycle heat recovery generator.

Embodiments of the system can be provided with an adsorption chiller refrigeration system.

In certain constructions, the $CO_2$ capture and cleanup subsystem includes at least two Thermal Swing Adsorption beds for purifying at least a portion of the exhaust gas. Alternatively, the $CO_2$ capture and cleanup subsystem can include at least two Pressure Swing Adsorption or VPSA beds. Still further, the $CO_2$ capture and cleanup subsystem can use a combination of Thermal Swing Adsorption beds and Pressure Swing Adsorption or VPSA beds for purifying at least a portion of the exhaust gas. The $CO_2$ capture and cleanup subsystem can be adapted to produce $CO_2$ for use in enhanced oil recovery process.

Preferably, the heat recovery system provides dry $CO_2$ for use in regenerating adsorption beds used in $CO_2$ capture and cleanup subsystem.

To achieve these and other advantages and in accordance with the purpose of the invention, as embodied, the invention includes, in one aspect an improved turbine engine semi-closed cycle power system. A further aspect of this invention is that the system preferably be compact, capable of operation on air or oxygen at high pressures, and that engine operation, heat recovery, and gas clean up be integrated in a fashion that improves efficiency and lowers capital cost. The intended result is to produce non-emissive power, at superior cycle efficiency (specific fuel consumption) to the state of the art when oxygen is available, but to also be capable of competitive cycle efficiency on air, and in either case to also provide saleable (pipeline specification) $CO_2$ at pressure. The ability to deliver the air/oxygen directly to the combustor, or to the compressor inlet (or both), allows one to independently control the amount of excess oxygen, and the oxygen to diluent ratio and temperature in the combustion process separately from the ratios and temperature (turbine inlet temperature) in the engine. As a result, a capability to operate with very low heating value fuels, or fuel water slurries, while still achieving good combustion is provided.

BRIEF DESCRIPTION OF THE DRAWINGS

So that those skilled in the art to which the subject invention appertains will readily understand how to make and use the systems and methods of the subject invention without undue experimentation, preferred embodiments thereof will be described in detail herein below with reference to certain FIGURES, wherein:

FIG. 1 illustrates a representative embodiment of the present invention.

These and other aspects of the subject invention will become more readily apparent to those having ordinary skill in the art from the following detailed description of the invention taken in conjunction with the drawings.

DETAILED DESCRIPTION OF CERTAIN EMBODIMENTS

The present invention is now described more fully with reference to the accompanying drawing, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

The present disclosure generally relates to a system of operating a gas turbine (Brayton cycle) engine in a semi-closed cycle, at pressure and in a manner which is non-emissive, and which produces saleable products, in particular $CO_2$ at pressure. The power system is fed with high pressure gaseous or liquid air, enriched air, or oxygen and with hydrocarbon fuel. Exhaust gas, which is mostly $CO_2$ when pure oxygen is used, and mostly $N_2$ when air is used, is recirculated to provide a combustion diluent and working fluid. System high grade waste heat can be used to generate additional power via a sub/super critical $CO_2$ Brayton cycle. System high grade waste heat can also be used to warm any non-condensable gas (such as $N_2$, when the diluent is air), prior to expansion and exhaust. Product $CO_2$ can also be generated at pressure, purified, and provided at pressure for the user, and also as a working fluid in the heat recovery system. The heat recovery system can additionally provide dry hot $CO_2$ for use in regenerating the gas purification thermal swing adsorption molecular sieves. Optionally, low grade waste heat is used via the adsorption chiller process to provide refrigeration for $CO_2$ liquefaction.

It is to be appreciated this system of the present invention is of particular use wherein both power and $CO_2$ at pressure are required for a process. Enhanced Oil Recovery is an example of such a process. It is further to be appreciated that the ability to operate on air vs. oxygen, although at much lower cycle efficiency, is beneficial when the duration of the operation is brief, high purity oxygen is unavailable, or when the deployment of an oxygen plant would not be practical (for example in offshore oil production platforms).

It is noted that while the below described system has many components for the embodiment with the highest efficiency, portions of the system are optional, for example, the waste heat recovery system or the adsorption chiller refrigeration system. Several alternative embodiments with various combinations of the aforementioned building blocks are also claimed.

Turning now to the drawings, FIG. 1 depicts a semi-closed cycle gas turbine engine power system, with separate high pressure oxidizer supply, heat recovery system, gas clean up system, and turbo expander system. Generally, in a closed cycle Brayton power generator, speed is a constant, and therefor pressure ratio is nominally constant, with power level changed by adding or removing mass from the cycle. In a semi-closed cycle, the same is true, but now it is the difference in added mass (fuel/oxidizer) and removed mass (product water, $CO_2$, and non-condensable gases) which are controlled to maintain a desired pressure/operating power level.

Accordingly, oxidizer, which is either air, or enriched air (predominantly oxygen/nitrogen, but with greater than 21% oxygen by volume), or high purity oxygen is provided via compressor/pump 1 to a buffer tank/pressure vessel 2, which in the case of cryogenic oxidizer supply would include a vaporizer. The oxidizer can be supplied in a range of pressures, up to a value in excess of the full combustion pressure of the system at full load, but generally at about 700-1,500 psia, greater than the inlet pressure of the main compressor. The oxidizer is supplied via control valve 3 to the inlet of the main compressor stages 4, and optionally via control valve 5 to the combustor 6. Valve 5 would be used for starting, for low pressure operation of the system, and by design at any time when the oxidizer supply pressure exceeds the combustion pressure. High pressure fuel is introduced to the combustor 6 via interface 7. The mixture of fuel, oxidizer, and compressed working fluid, heated via recuperator 8 generates the design point temperature for the main turbine 9, which is coupled to the main generator 10 or other driven load. The very high pressure (supercritical at design point, generally 1,000 to 6,000+ psia) nature of the cycle makes the recuperator much smaller than would be typical, and also reduces the relative to system pressure level pressure drop in the recuperator. Typically, at 1700+ F. turbine inlet temperature a pressure ratio of nominally 5 would be used (6000/1200 psia), generating turbine exhaust temperature of 1300-1400 F and combustor inlet temperatures of 1000-1200 F., depending on recuperator effectiveness and other factors. Higher temperatures are possible, and will result in higher cycle efficiencies, though the temperatures and material selection of the recuperator must be very well managed at these high temperatures and pressures.

The gas mixture at this point, the recuperator exit, will be the same as the combustion gas mixture, and will always include a small amount of water (steam), a greater amount of $CO_2$, and depending on the oxidizer choice, an amount of nitrogen. At 1750 F. combustion temperature, with 100% oxygen oxidizer, the working fluid at this point is 97% $CO_2$, 3% Water (by mass); with air as the oxidizer, the working fluid becomes about 17% $CO_2$, 3% Water, and 80% Nitrogen/Inert (Argon). This $CO_2$, $N_2$, and steam mixture flows to the super/sub-critical $CO_2$ Brayton cycle heat recovery generator, or (optionally) the Organic Rankine Cycle heat recovery generator, which cools it via the hot-side heat exchanger 11.

The heat recovery generator in general consists of a compressor/pump 12, a turbine 13, generator 14, and a low side heat exchanger 15. The heat recovery generator subsystem uses pure $CO_2$ (R744) as the working fluid, in the variant with the $CO_2$ Brayton Cycle, or for lower temperature heat recovery R134A, or R245FA. In the case of the Organic Rankine Cycle (ORC) heat recovery unit, the system inventory/pressure will not change radically with power level. The heat recovery system or generator, whether it is a SC CO2 (supercritical carbon dioxide) system or Rankine cycle system, such as R134A, or R245FA, can include a recuperator.

The closed supercritical $CO_2$ Brayton cycle heat recovery system is controlled via management of the load at generator 14 (runs at constant speed, hence constant pressure ratio) and by varying the total mass in the cycle. While 1200 psia inlet, 6000 psia outlet might be the compressor design point at full power, at $\frac{1}{10}^{th}$ power one would expect nominally 120 psia, and 600 psia at the same points—and cycle efficiency would in theory be unchanged (in fact it degrades slightly, since the cycle is closer to optimum at supercritical pressures). Other choices in pressure ratio and heat exchanger design pressure are of course possible, and one may choose to recuperate the heat recovery/waste heat to power subsystem. The pressure ratio of 5 is not optimum for the Brayton cycle alone, but gives reasonably low compressor exit temperatures, enabling good use of the available engine exhaust waste heat.

Note that additional engine high grade waste heat is recovered via the system final turbo expander 16 and control valve 16A (to be discussed later). In air breathing applications, the power at this generator will exceed and essentially replace the heat recovery unit—this is as a result of non-condensable gas flow being high (dominated by Nitrogen). With pure oxygen delivered to the cycle, and perfect combustion yielding $CO_2$ and water, there would not be a non-condensable flow—requiring a larger portion of the waste heat to be recovered with the closed supercritical $CO_2$ system or ORC. The cooled gas from high side heat exchanger 11, typically at 150-300 F, flows to the system cooler 17, and to the water separator column 18. Additional cooling is provided, which results in the majority of water from the combustion process condensing. Liquid water collects in the bottom of the water separator, with the amount of water withdrawal controlled via liquid level control, and via thermal management (cooling) of the water separator. The amount of cooling at this point determines the saturation level (partial pressure) of the water vapor in the recirculated exhaust stream at 19. At 140 deg F., the partial pressure of water vapor will be about 3 psia at point 19.

If the system pressure is 400 psia, then the recirculated exhaust will be 0.75% ($3/400^{th}$) water vapor by volume. Water vapor concentration can be increased to double that by cooling to only 170 F, or half of that by cooling to 110 F. Materials on the low pressure side of the system, from the recuperator 8 through the heat exchanger 11 to cooler 17 and separator 18 must be corrosion resistant. Condensation of the water in the exhaust will in most circumstances occur within heat exchanger 11. What liquid water droplets are produced will quickly saturate with $CO_2$, forming carbonic acid. Fortunately the overall water concentration is low, and hence the overall level of corrosion from the mixture is manageable.

Valve 20 and positive blower/compressor 21, driven by variable speed motor 22, combined with valve 23 (when system pressure is high), combine to balance the overall inventory in the system. Produced/excess gases are captured in pressure vessel 24. Excess recirculation gases are withdrawn from line 19 via positive displacement compressor 21 and variable speed motor 22. The speed of motor 22 is varied to maintain the desired pressure in the recirculation line, and indirectly at the main compressor inlet 4. As discussed, the gas withdrawn is mostly $CO_2$, if the system is running with oxygen as the oxidizer (preferred), but will be dominated by $N_2$ if air is the oxidizer and will also include some portion of $O_2$, Ar, and even some products of incomplete combustion, such as HC or CO.

In addition, the gas is saturated in water vapor, at probably 0.7% or so by volume. The full feature compressor 21, removes most of the water vapor by the combination of compression, cooling and coalescing filter moisture separation, but dew points can be expected to remain at 45-50 deg F. of so, which is a partial pressure of 0.1-0.2 psia of water. Thermal Swing Adsorber (TSA) beds 28 or 29 are used, controlled via three way valves 26 and 27, to complete the drying process, and adsorb a portion of other undesirable gases. The TSA is functionally similar to PSA (the use of a PSA or VPSA or a combination of TSA and PSA or VPSA is an alternative if two stage contaminant removal is required), a molecular sieve approach which adsorbs certain molecule sizes (with a 3A adsorbent or alumina, focused mostly on water removal, and with small amounts of other adsorbents to be tuned based on expected contaminants), but the regeneration is thermal—with hot dry gas used via ports/valves 30-33 to renew the beds (methodology to follow later). The amount of material (water) being removed is already very low, and cycle times for these beds will be many hours. Drying to dew points of −80 F. or lower is possible with this technology, though is not required for this application. The goal is only to remove water vapor, and a portion of the other non-$CO_2$ contaminants, to the level where frosting will not occur in later semi-cryogenic portions of the process, and as necessary to meet customer requirements. It is expected that dew points of −40 deg F. or better will be achieved at point 27, but that some "non-condensable" gases will remain. Large amounts of $N_2$ or Ar may be present, and depending on the operating conditions of the system, $O_2$ may exist. The latter is a problem for pipeline specification $CO_2$ (desired $O_2$ level 10 ppm).

Elimination of the $O_2$ is by physical separation of the liquid $CO_2$ from gaseous (non-condensable) contaminants. To that end, a counterflow heat exchanger 34, using the heat of vaporization of the previously liquefied $CO_2$, 38, provides initial cooling of the $CO_2$ rich mixture, which then flows to a low temperature chiller 35. $CO_2$ liquid is separated physically from other gases via separator 36, pumped as a liquid to 2000+ psig via pump 39, and vaporized back to the gaseous state in the heat exchanger. Non-condensable gases are vented at point 37, reheated in heat exchanger 11, and expanded via the turbo expander generator and control valve 16, and 16A to maintain the desired backpressure in the separation column 36.

When the oxidizer is oxygen, in theory if perfectly pure, the amount of non-condensable gases would be low (would still include some Argon) and the power level at the turbo expander would be insignificant. On the other hand, a 24 MW net main turbine system, if running on air, could require upwards of 15,000 hp of air compression at 1, but makes more than 9,000 hp at turbine 16. This difference in power, 7,000 hp is a parasitic load on the system, which is about twice the load of an appropriately sized cryogenic air separation unit. Hence, the air separation unit, and the ability to run on nearly pure oxygen are preferred, but are not required. In all cases, substantial net power is produced, at reasonable cycle efficiency, and the product gaseous, dry, and relatively pure $CO_2$ is provided at point 40.

At the more detailed level, an additional integration of this TSA drying system, the SC $CO_2$ Brayton Cycle Heat Recovery Unit, and the Turbo Expander 16 is not shown, but is discussed herein. Periodically, as discussed, the beds will require regeneration. Normally, product (dry $CO_2$) is electrically heated to 600 F. or more, and is blown counterflow back through the beds for drying. This wastes product and power, and also requires additional components.

In this system, turbine inlet bleed $CO_2$ from 13 is ported to points 31 or 32, and vented with valves 30 or 33, to regenerate the bed. Turbo expander exhaust, 41, can also be used to cool down the dry beds after regeneration if this flow is significant. Also periodically, additional working fluid mass may be required in the SC $CO_2$ Brayton Cycle Heat Recovery Unit. Dry $CO_2$ is provided at pressure from point 40, to compressor inlet, 12 to increase mass in the SC $CO_2$ Heat Recovery Unit. Finally, periodically, the mass in the SC $CO_2$ Heat Recovery Unit must be reduced, the same line as for regeneration is used, but without opening valves 30 or 33.

Other accessories, familiar to those with engine emissions control experience, can be integrated to this system to meet local emissions requirements. Obviously, the emission of $CO_2$ is all but eliminated with this system, but HC or CO may exist at point 41, or 30/33. A catalytic or piloted reactor can be inserted as required to either burn off hydrocarbons/CO with additional oxygen injection, or consume/get excess oxygen via fuel injection. The use of excess $O_2$, with certain catalysts, can also convert $SO_2$ to $SO_3$ at the temperatures that exist within recuperator 8—this conversion would enable sulfur capture (as $H_2SO_4$) via water separator 18. Alternatively the bed molecular sieves in 28 and 29 may be adjusted to optimize for $SO_2$ capture, and also for NOx, if the air breathing mode, combined with high combustion temperatures produces that product.

Additional heat recovery/heat utilization techniques familiar to those in the industry can also be applied, over and above the ones discussed herein. Adsorption Chillers can be also be integrated with cooler 17 and/or low side heat exchanger 15 to produce refrigeration in lieu of 35, or for other processes.

It is to be appreciated all the pressures and temperatures discussed herein can be varied quite a bit via the flexibility of the system. Turbine 9 inlet temperatures of 1000 F. to over 2500 F. have been studied and are effective. Compressor 4 inlet pressure should be near the critical point for $CO_2$ if $CO_2$ is the dominant working fluid to minimize compressor power—1200 psia is a typical design point. A pressure ratio of 5 (6000 psia pressure at combustor 6) will give good performance, and higher pressures are actually optimum at higher temperatures, but at some point material considerations and capital cost become a greater concern than the last few points of cycle efficiency. There is no minimum pressure in the recirculating loop (point 19), and pressure will be reduced as power level is reduced. The pressure at 24, and throughout the gas capture/cleanup portion of the system, through point 37, needs to be consistent with liquefaction of $CO_2$ and customer purity requirements (lower temperature at 35 will generally lower soluble gas contamination of the $CO_2$ stream). In all cases one must stay above the triple point of $CO_2$ (75 psia is probably a lower limit). All the pressures and other state variables discussed herein are nominal at this time (provisional filing), and will be narrowed/perfected in the coming year. The use of a conventional PSA/TSA/VPSA (or combinations thereof) mole sieve process for capture of $CO_2$ to the phase separation approach of item 36 is of course an option—the high system pressures of the overall Semi-Closed Cycle would make the beds of molesieve (13×) physically much smaller than at lower pressures, due to the greater adsorption capability of mole sieves a high pressure.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The above presents a description of a best mode contemplated for carrying out the present invention and of the manner and process of making and using it in such full, clear, concise, and exact terms as to enable any person skilled in the art to which it pertains to make and use these devices and methods. The present invention is, however, susceptible to modifications and alternative method steps from those discussed above that are fully equivalent. Consequently, the present invention is not limited to the particular embodiments disclosed. On the contrary, the present invention encompasses all modifications and alternative constructions and methods coming within the spirit and scope of the present invention.

The descriptions above and the accompanying drawing should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A semi-closed cycle turbine power system to produce saleable $CO_2$ product, comprising:
   an oxidizer supply subsystem for producing an oxidizer;
   a turbine engine that includes at least one main compressor stage, a combustor and a main turbine, wherein the oxidizer supply subsystem provides at least a portion of the oxidizer produced by the oxidizer supply subsystem to the at least one main compressor stage;
   a fuel supply system for providing fuel to the combustor of the turbine engine and wherein operation of the turbine engine produces power and an exhaust gas;
   an exhaust gas recirculation subsystem for recirculating at least a portion of the exhaust gas created by operation of the turbine engine to the at least one main compressor stage of the turbine engine;
   a molecular sieve based $CO_2$ capture and cleanup subsystem for producing pressurized $CO_2$ from at least a portion of the exhaust gas, the molecular sieve based $CO_2$ capture and cleanup subsystem having one or more adsorption beds; and
   a heat recovery unit which receives at least a portion of the exhaust gas produced by operation of the turbine, wherein the heat recovery unit is configured to generate additional power via a super critical Brayton $CO_2$ cycle, and the heat recovery unit configured to produce dry $CO_2$, and wherein the heat recovery unit is operatively connected to the one or more adsorption beds to provide the dry $CO_2$ produced by the heat recovery unit to the one or more adsorption beds to regenerate the one or more adsorption beds used in the molecular sieve based $CO_2$ capture and cleanup subsystem.

2. The system of claim 1, further comprising a non-condensable turbo expander for additional waste heat and power recovery.

3. The system of claim 1, wherein the exhaust gas recirculation subsystem includes a heat exchanger and a water cooling and separation subsystem.

4. The system as recited in claim 1, wherein the oxidizer from the oxidizer supply subsystem includes air.

5. The system as recited in claim 4, wherein the air and oxidizer mixture is enriched air greater than 21 percent but less than 100 percent oxygen by volume.

6. The system as recited in claim 5, wherein the oxidizer supply subsystem includes a compressor and a buffer tank.

7. The system as recited in claim 1, wherein the oxidizer supply subsystem provides high purity oxygen having an oxygen content of greater than 90% as an oxidizer to the turbine engine.

8. The system as recited in claim 7, wherein the oxidizer supply subsystem includes a pump and a vaporizer.

9. The system as recited in claim 1, further comprising a recuperator positioned between the at least one main compressor stage and combustor of the turbine engine.

10. The system as recited in claim 1, wherein a portion of the oxidizer produced by the oxidizer supply subsystem is provided to the combustor of the turbine engine.

11. The system as recited in claim 1, further comprising an adsorption chiller refrigeration system.

12. The system as recited in claim 1, wherein $CO_2$ capture and cleanup subsystem includes at least two Thermal Swing Adsorption beds for purifying at least a portion of the exhaust gas.

13. The system as recited in claim 1, wherein $CO_2$ capture and cleanup subsystem includes at least two Pressure Swing Adsorption or Vacuum Pressure Swing Adsorption (VPSA) beds for purifying at least a portion of the exhaust gas.

14. The system as recited in claim 1, wherein the one or more adsorption beds include a combination of Thermal Swing Adsorption beds and Pressure Swing Adsorption or Vacuum Pressure Swing Adsorption (VPSA) beds for purifying at least a portion of the exhaust gas.

15. The system as recited in claim 1, wherein CO2 produced by the $CO_2$ capture and cleanup subsystem is adapted for use in enhanced oil recovery process.

* * * * *